Sept. 14, 1954 W. J. REIMAN 2,688,973
AUTOMOBILE STORAGE DEVICE
Filed June 1, 1953 2 Sheets-Sheet 1
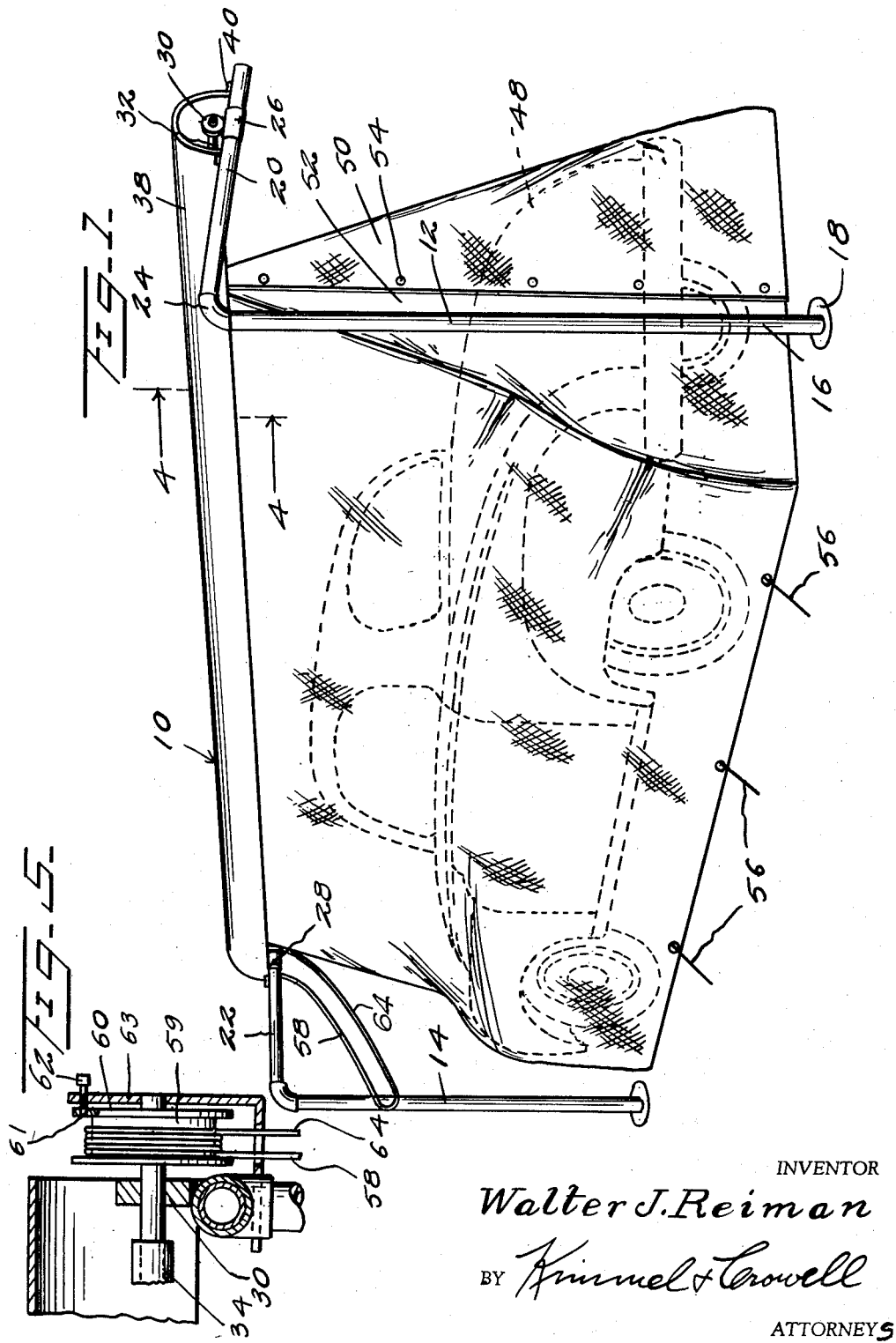
INVENTOR
Walter J. Reiman
BY Kimmel & Crowell
ATTORNEYS

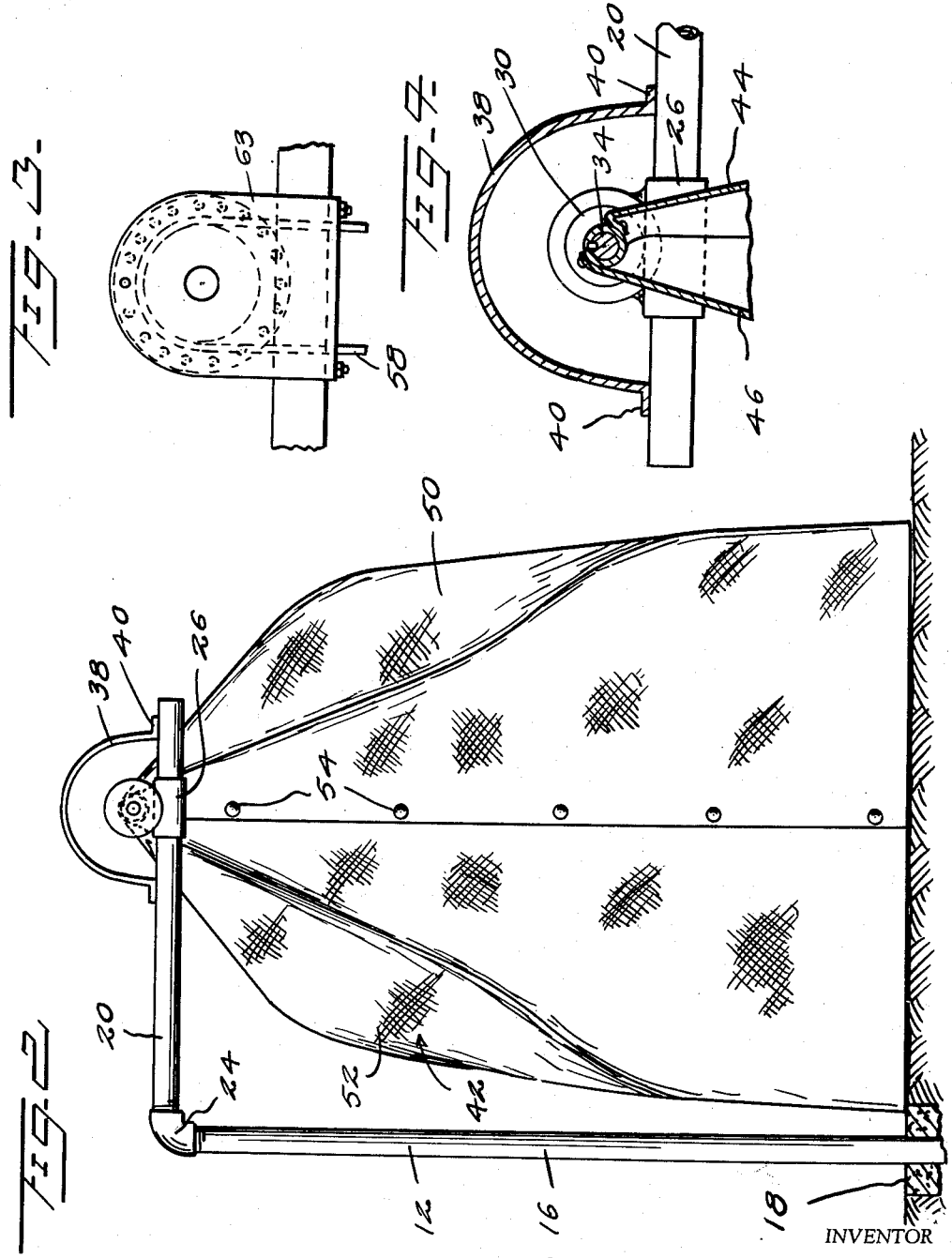

Patented Sept. 14, 1954

2,688,973

UNITED STATES PATENT OFFICE 2,688,973

AUTOMOBILE STORAGE DEVICE

Walter J. Reiman, Peoria, Ill.

Application June 1, 1953, Serial No. 358,841

3 Claims. (Cl. 135—1)

This invention appertains to an improvement in storage devices for automobiles and the like, and has for its primary object to provide a flexible enclosure for an automobile, means being provided for retaining the enclosure in position to be completely draped over an automobile and completely cover and protect it from the elements.

Another object of this invention is to provide a flexible cover and a retaining means therefor, the retaining means being mounted in such a way as to be positioned coincident with the longitudinal center line of a vehicle so that the cover can be pulled down from the retaining means and easily and conveniently formed into an enclosure for the automobile.

A further object of this invention is to provide a pair of inverted L-shaped supports, the free ends of the horizontal sections thereof supporting a roller which extends longitudinally therebetween and carries a cover that forms an enclosure for an automobile parked alongside the vertical sections of the supports, and having its longitudinal center line approximately underlying the roller.

Another object of this invention is to provide an inexpensive and extremely simple form of storage device, which can be permanently mounted on the ground or used as a temporary means of enclosing and protecting an automobile.

These and ancillary objects and structural features of merit are attained by this invention, the preferred embodiment of which is set forth in the following description and illustrated in the accompanying drawings wherein:

Figure 1 is a view in perspective of a storage device constructed in accordance with this invention, and showing the same in operative use with an automobile, shown in dotted lines, housed therein;

Figure 2 is a front elevation thereof;

Figure 3 is a fragmentary front elevation of the upper portion thereof, showing the means for rotating the roller.

Figure 4 is a detailed cross sectional view taken on line 4—4 of Figure 1; and

Figure 5 is a fragmentary longitudinal vertical sectional view of one end of the roller, shown in front elevational view in Figure 3.

Referring now more particularly to the drawings, the storage device 10 includes a pair of inverted L-shaped supports 12—14. Each of the supports has a vertical standard or section 16 which terminates at its lower end in an annular mounting flange 18 that may be bolted to a cement driveway, or suitably anchored on or in the ground. The vertical sections of the supports are spaced apart in line with each other and carry the horizontal sections 20—22 which may be integral with the upper ends thereof or as shown in the drawings, secured thereto by an elbow 24. The supports 12—14 are tubular and are of light weight so that they are easily portable.

On each of the vertical sections 20—22 adjacent the free ends thereof, are sleeves 26—28 to which upstanding bearings 30 are fixedly secured to rotatably support the journals or ends 32 of a roller 34. Overlying the roller 34 in protective fashion is an elongated semi-circular cover 38, which has laterally extending mounting feet 40 projecting outwardly from its sides at its opposite ends, the feet being suitably mounted on the horizontal sections 20—22. A flexible enclosure 42 is provided and is carried by the roller 34, the enclosure being in two longitudinal separate sections 44—46 respectively. The upper ends of each of the sections are suitably secured to the roller and are adapted to enclose opposite sides of a vehicle 48. The sections have complementary end flaps 50—52 which enclose the rear end of the vehicle and which are releasably secured together by snap fasteners 54 or other suitable fastening means. Similarly, the sections have front flaps (not shown) which are adapted to enclose and cover the front end of the vehicle, and which have their adjoining edges suitably fastened together, as for example by snap fasteners similar to snap fasteners 54.

When the enclosure is in operative position, as shown in Figures 1 and 2, the sections 44—46 cover the opposite sides of the vehicle 48 and the adjoining ends or flaps on the ends of the sections enclose the front and rear ends of the vehicle. The sections are draped around the vehicle and hang to the ground. If desired or found necessary, flexible elements 56 may be carried by the lower ends of each section and suitably anchored to the ground. However, this is not necessary but it is desirable to provide one of such flexible elements and to locate it centrally of one of the sections to be used as a pull member in pulling the sections down and unwinding them from the roller 34.

To rewind the sections, the snap fasteners are opened, or whatever fastening means is used is opened or released to leave the ends of the sections free. The roller is then rotated by pulling downwardly on one side 58 of a looped flexible member which is wound about a reel 59 secured to roller 34 and is extended in a loop downwardly from reel 59. The outer flange 60 of reel 59 has a series of keeper openings 61 therein and a locking pin 62 engaging through bracket 63 is engageable in a selected keeper opening 61 to lock reel 59 and roller 34 against rotation.

In use, the enclosure is wound on the roller and the roller is held against rotation by the locking pin 62. The automobile 48 is driven alongside the vertical sections 12—14 so that the longitudinal center line thereof approximately underlies the roller 34. The pin is withdrawn and the cover sections are pulled downwardly by pulling on the other side 64 of the looped flexible member. The sections will enclose the sides of the vehicle and by fastening the ends together, through the medium of the fasteners 54, the front and rear ends of the automobile will be completely enclosed. Thus, a flexible enclosure will be provided which will completely enclose the automobile and protect all parts of it from the elements.

While the operation of the cover, in particular the winding of it on the roller has been described as being manually effected, it is to be understood that automatic means may be provided, such as hereinbefore referred to, and in addition a spring roller may be provided.

Therefore, since other forms may be realized, limitation is sought only in accordance with the appended claims.

What is claimed is:

1. A storage device for a vehicle comprising a pair of spaced side-by-side horizontally disposed members, means associated with one of the ends of each member for retaining the members vertically spaced above the ground at a height at least greater than the height of a vehicle which can be driven thereunder, said members having free ends that terminate at a point which substantially coincides with the longitudinal center line of a vehicle parked thereunder and a flexible cover carried by the free ends of the arms and adapted to be draped over a vehicle parked under the arms, a roller rotatably supported by the ends and extending therebetween and carrying the cover and means for rotating the roller to wind the cover thereon, said cover being in two longitudinally separate sections, each section enclosing one side of a vehicle and means connecting the adjoining ends of the sections together around the front and the rear ends of a vehicle.

2. A storage device for an automobile comprising a pair of inverted L-shaped supports having vertical sections adapted to be mounted on the ground and side-by-side parallel horizontal sections which are spaced apart, a roller rotatably supported by the free ends of the horizontal sections and extending therebetween, said roller lying on a line approximately coinciding with the longitudinal center line of a vehicle parked thereunder, a cover carried by the roller and including two longitudinally separate sections adapted to be draped over an automobile parked alongside the vertical sections of the supports, each section enclosing one side of an automobile and means connecting the adjoining ends of the sections together around the front and the rear ends of an automobile.

3. A storage device for an automobile comprising a pair of inverted L-shaped supports having vertical sections adapted to be mounted on the ground and side-by-side parallel horizontal sections which are spaced apart, a roller rotatably supported by the free ends of the horizontal sections and extending therebetween, said roller lying on a line approximately coinciding with the longitudinal center line of a vehicle parked thereunder, a cover carried by the roller and including two longitudinally separate sections adapted to be draped over an automobile parked alongside the vertical sections of the supports, each section enclosing one side of an automobile and means connecting the adjoining ends of the sections together around the front and the rear ends of an automobile, means for rotating the roller, and means for locking said rotating means.

References Cited in the file of this patent

UNITED STATES PATENTS

| Number | Name | Date |
|---|---|---|
| 385,389 | Titus | July 3, 1888 |
| 2,097,923 | Hutchinson | Nov. 2, 1937 |

FOREIGN PATENTS

| Number | Country | Date |
|---|---|---|
| 580,691 | Great Britain | Sept. 17, 1946 |